United States Patent [19]

Tursi

[11] Patent Number: 4,924,597

[45] Date of Patent: May 15, 1990

[54] TAPE MEASURE DEVICE

[76] Inventor: Angelo Tursi, 1553 Madison St., Elmont, N.Y. 11003

[21] Appl. No.: 412,349

[22] Filed: Sep. 26, 1989

[51] Int. Cl.⁵ .............................................. G01B 3/10
[52] U.S. Cl. ........................................................ 33/758
[58] Field of Search ................. 33/758, 759, 761, 766, 33/767, 768, 769, 770, 668, DIG. 1; 248/205.5, 206.3; 242/107.3; 114/296

[56] References Cited

U.S. PATENT DOCUMENTS

| | | | |
|---|---|---|---|
| 2,599,320 | 6/1952 | Dart | 242/107.3 |
| 2,711,030 | 6/1955 | Drew et al. | 33/758 |
| 2,776,448 | 1/1957 | Trannell, Jr. | 33/761 |
| 3,036,791 | 5/1962 | Siggelkow | 242/107 |
| 3,100,937 | 8/1963 | Burch | 33/770 |
| 3,885,314 | 5/1975 | Banas, Sr. | 33/668 |
| 4,729,171 | 3/1988 | Samson | 33/668 |
| 4,735,391 | 4/1988 | Lawrence | 248/205.5 |

FOREIGN PATENT DOCUMENTS 876073 8/1961 United Kingdom ............ 248/205.5

Primary Examiner—William A. Cuchlinski, Jr.
Assistant Examiner—D. Price
Attorney, Agent, or Firm—Terry M. Gerdstein

[57] ABSTRACT

A tape measure device is adaptable for mounting on a wide variety of different items and includes a suction cup assembly that has a suction cup attached to the casing of the device and which is accommodated in a chamber defined in the casing when the cup is not in use. The device includes magnets and a bracket assembly for attaching the device to various items.

8 Claims, 2 Drawing Sheets

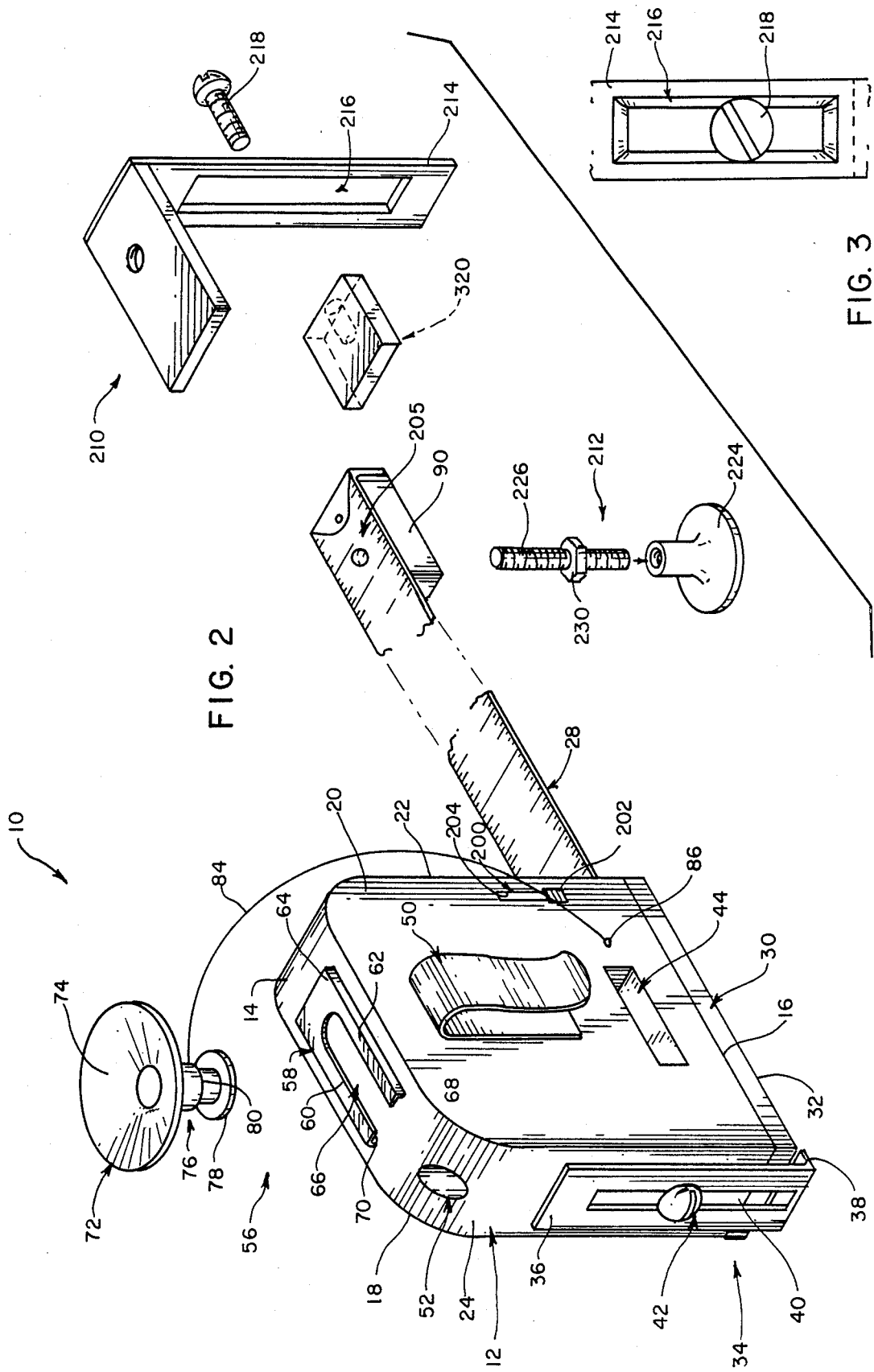

TAPE MEASURE DEVICE

TECHNICAL FIELD OF THE INVENTION

The present invention relates to the general art of measuring devices, and to the particular field of tape measures.

BACKGROUND OF THE INVENTION

The craftsman is often called upon to measure items that have dimensions far exceeding his reach. Therefore, the art contains many devices, such as retractable tape measures, which are adaptable to use with long items. Still further, in order to facilitate use by one person, many of these tape measures include means for attaching one end of a tape to a support. Such attaching means range from a simple hook to magnets or the like.

While these device are somewhat successful in permitting a user to measure long items, they have certain drawbacks which prevent them from being useful in a wide variety of situations.

For example, the devices known to the inventor are not amenable to being attached to the item being measured firmly and securely enough to ensure that the device will not move as the tape is being withdrawn. Still further, these devices are not amenable to being attached to a wide variety of items, each of which may have a different set of constraints affecting the mode and means of attaching the measuring device thereto. Thus, even those measuring devices having some form of attaching means, such as those devices disclosed in U.S. Pat. Nos. 2,663,941 and 3,036,791, have limited usefulness which inhibits the full commercial acceptance thereof.

Accordingly, there is a need for a tape measure device that can be used for a wide variety of applications, and can be amenable to being mounted on a wide variety of different surfaces and items.

OBJECT OF THE INVENTION

It is a main object of the present invention to provide a tape measure device that can be used on a wide variety of different items.

It is another object of the present invention to provide a tape measure device that can be used on a wide variety of different items and Which can be securely and firmly affixed to the item being measured.

It is another object of the present invention to provide a tape measure device that can be used on a wide variety of different items including metallic items.

It is another object of the present invention to provide a tape measure device that can be used on a Wide variety of different items including glass-like items.

It is another object of the present invention to provide a tape measure device that can be used on a wide variety of different items and which includes a suction cup assembly.

It is another object of the present invention to provide a tape measure device that can be used on a wide variety of different items and which includes a suction cup assembly that can be protected against being lost.

It is another object of the present invention to provide a tape measure device that can be used on a wide variety of different items and which includes a suction cup assembly that can be protected against being lost and from contamination.

SUMMARY OF THE INVENTION

These, and other, objects are achieved by a tape measure device which includes a casing having a variety of different mounting means attached thereto. Specifically, the mounting means include a bracket which can be moved into secure mounting attachment with the item being measured, as well as a suction cup assembly. The suction cup assembly includes a suction cup that is attached to the casing, as by a retractable cord, and which fits into a chamber defined in the casing. The chamber accomplishes at least two purposes: it provides a further attaching means for the casing; and it provides a storage area for the suction cup to prevent that cup from contamination. The device further includes magnets and a nail-receiving bore as well as a clip for mounting the device on a user's belt.

In this manner, the tape measure device of the present invention is amenable to being mounted on a wide variety of different items and surfaces, including glass-like surfaces. The mounting means will always be in position for easy access by the user and will always be in condition to securely mount the casing on the item being measured. This is especially true for the mounting means that will be used for attaching the tape measure device to glass, since the suction cup will be kept in a manner that prevents it from being contaminated. Since many tape measure devices are used in environments that contain dust, dirt and other gritty products, suction cups are susceptible to having the suction thereof impaired. By storing the suction cup of the present device in a chamber on the casing, such contamination will be prevented from reaching the cup and inhibiting the suction action thereof. The cup is also tethered to the device so it will not be lost.

DESCRIPTION OF THE DRAWING FIGURES

FIG. 2 is an alternative embodiment of the device.

FIG. 3 is an end view of the FIG. 2 embodiment.

DETAILED DESCRIPTION OF THE PREFERRED EMBODIMENT OF THE INVENTION

Figure 1:
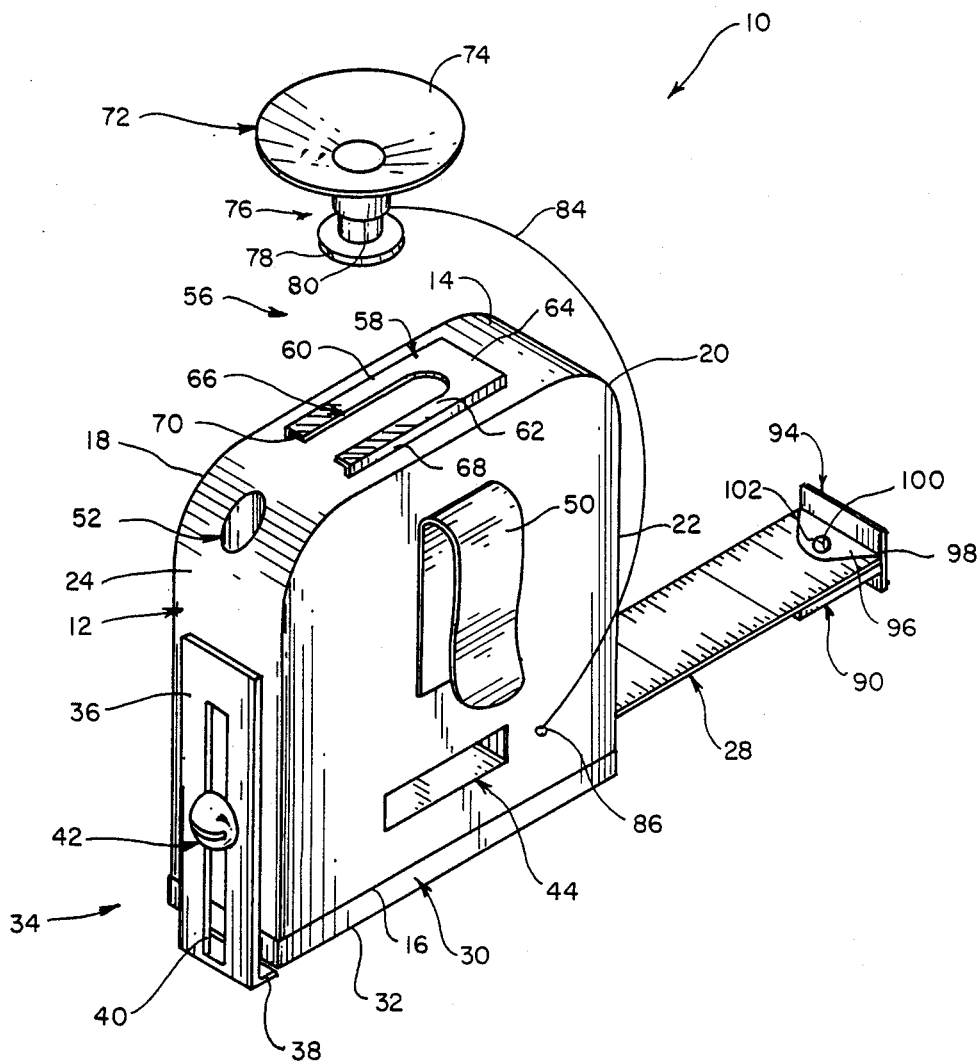
FIG. 1 shows a tape measure device embodying the present invention.

Shown in the figure is a tape measure device 10 which embodies the present invention and is amenable to being securely and firmly mounted on a wide variety of different surfaces and items, including the usual wood and metal items encountered by a craftsman, as well as glass and glass-type items and the like.

Specifically, the device 10 comprises a casing 12, which can be metal, plastic or the like, and which includes a top wall 14, a bottom wall 16, a front wall 18, a rear wall 20, a forward end wall 22 and an aft end wall 24, all of which are interconnected to define a casing for containing a tape measure 28.

The tape measure 28 is flexible, and is retractably held in the casing in a manner that is usual to such devices, such as is disclosed in patents, such as U.S. Pat. No. 2,599,320 and the like. The tape measure includes the usual measuring indicia and extends into and out of the casing via a slot (not shown) defined in the casing forward end wall 22. The slot can be similar to that slot shown in U.S. Pat. No. 3,036,791. Since the exact manner in which the tape measure is held in the casing is not part of the present invention, and since those skilled in the art will know how to build such a retracting means from patents such as the just-mentioned patent, the exact nature thereof will not be discussed.

In order to make the device 10 amenable to being securely mounted on a plurality of different items, that device 10 includes a plurality of different mounting means.

These mounting means include a first permanent magnet 30 secured to the casing bottom wall 16 to cover essentially the entire area of that bottom wall. The permanent magnet 30 is of the type that is used to firmly and securely mount to metal objects, and includes a bottom surface 32.

The mounting means further includes a bracket arm assembly 34 to adjustably secure the casing to objects of various thicknesses. The assembly 34 includes an L-shaped bracket body having a long leg 36 and a short leg 38 with an elongate slot 40 being defined in the long leg 36. The long leg is movably attached to the casing aft end wall 24 by an adjustable fastener, such as lock screw 42 that threadably engages a co-operating threaded bore defined in the casing and which has a head that engages the long leg adjacent to the slot 40. The short leg 38 is located to be subadjacent to the magnet bottom surface 32 to trap an item between the short leg 38 and the magnet 30. With the item so trapped, the fastener is secured and the casing is mounted on that item via the bracket assembly.

The attaching means further includes a chamber 44 defined in the casing rear wall 20, and which is shown as being rectangular in cross section, but could be other shapes as will occur to one skilled in the art based on the teaching of the present disclosure. The chamber 44 includes a top wall 46, a bottom wall 48 and side walls 50, with the top and bottom walls being separated by the width dimension of the chamber and the side walls being separated by the length dimension of the chamber. The chamber also includes a back wall that is not shown in the figure.

The chamber 44 is used to attach the casing to various items that may have a projection portion, such as a key-like projection or the like. As will be discussed below, the chamber 44 also serves a second purpose as well, and such second purpose will be discussed below.

The mounting means also includes a U-shaped clip 50 affixed to the rear wall 20 and which is sized and configured to securely mount the casing to a user's belt. The clip is thus flexible and biased closed, and can be metal or plastic or the like.

The mounting means also includes an elongate nail-receiving bore 52 that is defined in the casing to extend from the top wall 14 towards the bottom wall 16. The bore 52 is sized and configured to receive a nail that is mounted in the item being measured. The bore is thus sized to receive and accommodate a finishing nail, but can also be sized to receive a nail head of another type of nail if suitable. Using the nail bore 52, the casing can be mounted on an item that otherwise may not have any means for holding the device 10.

To permit the device 10 to be mounted on glass items, ceramic items, or the like, the mounting means further includes a suction cup assembly 56. The suction cup assembly includes a U-shaped bracket 58 mounted on top of the top wall 14. The bracket 58 includes two legs 60 and 62 connected together by a bight section 64 and which are spaced apart to define therebetween an elongate open ended slot 66. Spacer means, such as flange 68 connected to the leg 62, mount the bracket 58 on the top wall to space the legs and the bight section upwardly from the top wall to define a gap 70 between such legs and top wall. The purpose of the gap will be apparent from the ensuing discussion.

The suction cup assembly further includes a suction cup element 72. The element 72 is unitary and includes a concave body 74 having a base element 76 attached thereto to extend outwardly therefrom. A flange 78 is attached to the base at a position that is remote from the concave body, and extends radially outwardly from the base. The base includes a stepped outer surface that has a shoulder 80 defined therein to be spaced from the flange by a distance that corresponds to the thickness of the bracket legs and bight section. The figure shows this spacing to be larger than the thickness of the bracket 58 for the purpose of clarity, but such spacing is intended to be only slightly greater than such thickness to permit the assembly to function in a manner as will be apparent from the ensuing disclosure.

The suction cup element 76 is slidably and releasably mounted on the bracket 58 by sliding the base into the slot 66 with the flange 78 under the bracket legs and the shoulder 80 abutting the top surface of the bracket. The suction cup element will thus be held in position on the casing with the concave surface of the cup element facing upwards in position to grasp an element or item to which the casing is to be mounted.

A flexible connecting link 84 is connected at one end thereof to the base element 76 and at the other end thereof to the casing by a rotatable anchor 86. The ink 84 will be used to prevent the suction cup element from being separated from the casing. The connecting link is preferably cord, such as cotton cord, filament or the like. The preferred embodiment includes a winding mechanism in the base section 76 of the suction cup assembly to wind the cord into that base element to prevent the cord from getting in the way. The winding mechanism in the base section preferably is similar to that used to wind the tape measure 28 into the casing and thus is controlled by a spring mechanism such as indicated in U.S. Pat. Nos. 3,036,791 and 2,599,320, the disclosures of which are incorporated herein by reference.

The device 10 further includes a second permanent magnet 90 affixed to the tape measure 28 near the free end 92 of that tape measure. The device further includes a T-shaped hook 94 having a body 96 and a head 98 at right angles to that body. The hook body is attached to the tape measure by a hollow rivet 100 that also attaches the magnet 90 to that tape measure and which includes a bore 102 extending therethrough.

The bore provides a means for attaching a nail or other such fastener to an item being measured to thereby attach the tape measure thereto. The hook head 98 extends on both top and bottom of the tape measure so the hook can be attached to the item being measured to fix the tape in position.

The chamber 44 is sized to have a thickness and a width that are sufficient to receive and snugly accommodate the suction cup element with the base and the cup located inside that chamber. The fastener 84 is anchored adjacent to the chamber so the cord can be placed in the chamber if it is not retracted into the base. This permits the suction cup assembly to be stored in a convenient location on the casing and to be stored in a manner that will inhibit contamination from reaching the suction cup and thereby vitiating the effectiveness of that cup. Since the device 10 may be used by carpenters and the like, granular contamination may be a problem, and the use of the chamber 44 as a storage chamber will help to prevent such granular contamination from reaching the suction cup.

Shown in FIGS. 2 and 3 is an alternative embodiment of the device which includes a slide 200 lock which stops the tape by jamming an element against the tape when the handle 202 is forced downwardly in the slot 204. The device includes a threaded opening 205 in the tape 28.

The device also includes a front clamp assembly 210 that slips over the front of the tape 28 and is secured thereto by a threaded fastener 212. The clamp assembly includes a flange 214 having a beveled slot 216 through which a threaded fastener 218 fits to couple to a clamp block 220 which will engage the magnet 90 to clamp an element therebetween.

The device shown in FIG. 2 further includes a suction cup 224 on threaded fastener 226 which fits through the opening 205 to attach that suction cup to the tape 28. A threaded nut 230 is placed on the fastener 226 to adjust the height of the suction cup assembly.

If suitable, all slots of the device can be beveled.

It is understood that while certain forms of the present invention have been illustrated and described herein, it is not to be limited to the specific forms or arrangements of parts described and shown.

I claim:

1. A tape measure device comprising:
   (A) a casing which includes a top wall, a bottom wall, a front wall, a rear wall, a forward end wall and an aft end wall;
   (B) a tape measure retractably mounted in said casing;
   (C) a first permanent magnet mounted on said casing bottom wall;
   (D) a bracket arm assembly movably mounted on said casing aft end wall and including
      (1) an L-shaped body having a long leg abutting said housing aft end wall and a short leg disposed subadjacent to said first permanent magnet,
      (2) a slot defined in said long leg, and
      (3) a fastener attached to said casing aft end wall and extending through said slot;
   (E) a chamber defined in said casing rear wall;
   (F) a U-shaped clip mounted on said casing rear wall;
   (G) an elongate nail-receiving bore defined in said casing aft end wall to extend toward said casing bottom wall;
   (H) a suction cup assembly which includes
      (1) a U-shaped bracket mounted on said casing top wall, and having two spaced apart legs which are connected together by a bight section to define an open ended slot, and spacer means connecting said legs and said bight section to said casing top wall to space said legs and said bight section from said casing top wall, and
      (2) a unitary suction cup element having
         (a) a concave body,
         (b) a base on said concave body, said base having a stepped outer surface to define a shoulder, and
         (c) a circular flange on one end of said base, said flange having a diameter that is larger than the space between said bracket legs and having a thickness that is slightly less than the space between said bracket legs and said bracket bight section and said casing top wall, said flange being spaced from said shoulder a distance that is slightly greater than the thickness of said bracket legs and said bracket bight section whereby said flange is slidably and releasably mountable on said bracket with said shoulder, said casing top wall and said bracket controlling movement of said suction cup element, and
         (d) a flexible connecting link connecting said base to said casing;
   (I) a second permanent magnet mounted on said tape measure;
   (J) a hook on said tape measure adjacent to said second permanent magnet; and
   (K) a bore defined through said tape measure, said hook and said second permanent magnet.

2. The tape measure device defined in claim 1 wherein said flexible connecting link is attached to said casing adjacent to said chamber.

3. The tape measure device defined in claim 2 wherein said suction cup assembly further includes means for retracting said flexible link into said suction cup base.

4. The tape measure device defined in claim 2 wherein said chamber is sized to accommodate said suction cup body.

5. The tape measure device defined in claim 1 wherein said fastener includes a lock screw.

6. The tape measure device defined in claim 5 wherein said first permanent magnet is sized to cover essentially all of said casing bottom wall.

7. The tape measure device defined in claim 6 further including a clamping assembly releasably mounted on the tape measure.

8. The tape measure device defined in claim 7 further including a suction assembly releasably mounted on the tape measure.

* * * * *